United States Patent [19]

Araya et al.

[11] Patent Number: 4,732,369
[45] Date of Patent: Mar. 22, 1988

[54] ARC APPARATUS FOR PRODUCING ULTRAFINE PARTICLES

[75] Inventors: Takeshi Araya, Higashikurume; Yoshiro Ibaraki, Ibaraki; Yoshishige Endo, Ibaraki; Susumu Hioki, Kashiwa; Masatoshi Kanamaru, Ibaraki, all of Japan

[73] Assignee: Hitachi, Ltd., Tokyo, Japan

[21] Appl. No.: 898,600

[22] Filed: Aug. 21, 1986

[30] Foreign Application Priority Data

Oct. 30, 1985 [JP] Japan .................. 60-241408
Oct. 30, 1985 [JP] Japan .................. 60-241409
Mar. 10, 1986 [JP] Japan .................. 61-50393
Mar. 10, 1986 [JP] Japan .................. 61-50394
Mar. 10, 1986 [JP] Japan .................. 61-50395

[51] Int. Cl.[4] .................................. B22F 9/14
[52] U.S. Cl. .................. 266/207; 75/0.5 C; 264/10; 373/60; 373/90; 425/6
[58] Field of Search .............. 266/200, 207; 75/0.5 C; 264/10; 425/6; 373/60, 67, 68, 69, 70, 90

[56] References Cited

U.S. PATENT DOCUMENTS

| 3,975,184 | 8/1976 | Akers ........................... 373/60 |
| 4,376,740 | 3/1983 | Uda et al. ..................... 264/10 |
| 4,482,134 | 11/1984 | Uda et al. ..................... 266/217 |
| 4,610,718 | 9/1986 | Araya et al. .................. 75/0.5 C |
| 4,642,207 | 2/1987 | Uda et al. ..................... 264/10 |

FOREIGN PATENT DOCUMENTS 2117417 10/1983 United Kingdom ............. 75/0.5 C

*Primary Examiner*—L. Dewayne Rutledge
*Assistant Examiner*—Robert L. McDowell
*Attorney, Agent, or Firm*—Antonelli, Terry & Wands

[57] ABSTRACT

An apparatus for producing ultrafine particles by arc energy characterized by disposing an electrode inclinedly as to a base material so as to generate a magnetic blow to arc, disposing a suction opening at the direction of the arc blown, and cooling vapors generated, followed by collection thereof can improve the production efficiency of ultrafine particles with a uniform particle size.

14 Claims, 13 Drawing Figures

ELECTRODE ANGLE
FROM HORIZONTAL DIRECTION
($\theta°$)

ARC APPARATUS FOR PRODUCING ULTRAFINE PARTICLES

BACKGROUND OF THE INVENTION

This invention relates to an apparatus for producing ultrafine particles of metals, alloys, ceramics, and the like.

Apparatuses for producing ultrafine particles of metals, etc. are disclosed, for example, in U.S. Pat. No. 4,482,134. But, in said U.S. patent, a care for making the particle size produced uniform is insufficient and arc energy is not used sufficiently effectively.

SUMMARY OF THE INVENTION

It is an object of this invention to provide an apparatus for producing ultrafine particles of metals, alloys, ceramics, etc., in high efficiency. It is a further object of this invention to provide an apparatus for producing ultrafine particles of metals, alloys, ceramics, etc., by arc energy with sufficiently effectively.

This invention provides an apparatus for producing ultrafine particles of metals, alloys or ceramics by using arc energy comprising a generating chamber for generating ultrafine particles of metals, alloys or ceramics, an electrode positioned opposite to a base material for producing ultrafine particles so as to generate an electric arc, a suction opening for sucking the ultrafine particles generated in the generating chamber, a trap for collecting the ultrafine particles sucked from the suction opening, and a cooler positioned between the suction opening and the trap for cooling the sucked ultrafine particles, characterized in that the electrode is disposed inclinedly as to the base material so as to produce magnetic blow to the arc, the suction opening is positioned at the direction of the arc blown, and a cooling-gas feeder is positioned near the arc.

DETAILED EXPLANATION OF THE INVENTION

The apparatus of this invention for producing ultrafine particles by arc energy is characterized by forming a magnetic blow to an electric arc by inclining an electrode regarding a base material placed horizontally, forming a suction opening at a blown direction, and equipping a cooling-gas feeder around the arc in order to cool a metal vapor produced.

The base material is placed in a crucible or is used in the form of a rod similar to the electrode for arc discharge. By using as the base material one obtained by melting in an atmosphere containing oxygen, or one obtained by adding an element of increasing the surface tension of a molten metal by increasing the temperature, ultrafine particles can be produced effectively. The inclined angle of the electrode is preferably in the range of 10° to 50° based on the horizontal line. The desired ultrafine particles can be produced more effectively by installing another arc-discharge electrode vertically (90° as to the horizontal line) in addition to the arc-discharge electrode inclined at the angle mentioned above (hereinafter referred to "a first arc-discharge electrode").

Figure 1:
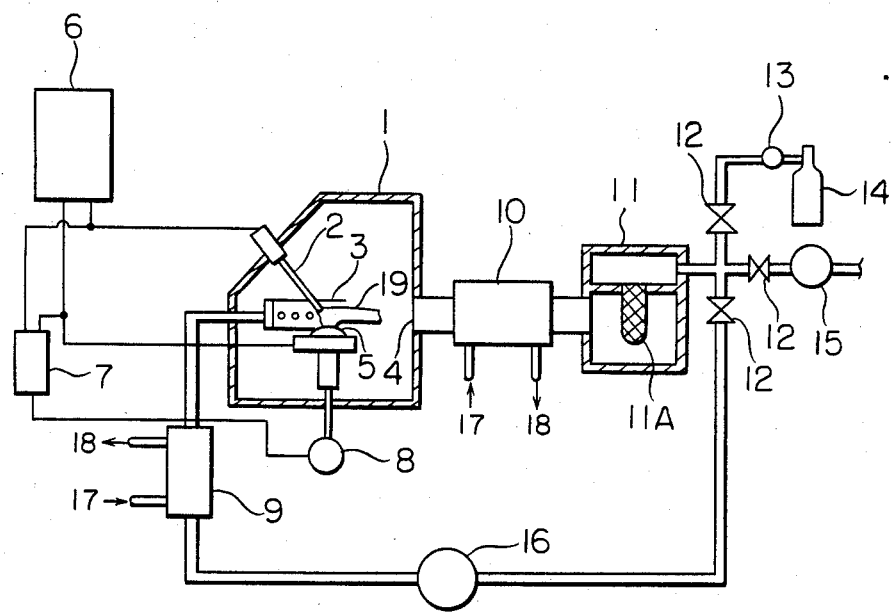
FIG. 1 is a schematic cross-sectional view of one example of the apparatus of this invention.

The apparatus for producing ultrafine particles of metals, alloys or ceramics of this invention is explained referring to FIG. 1, wherein ultrafine particles produced in a generating chamber 1 are passed to a trap 11 through a cooler 10 with a circulating gas and trapped by a filter 11A. The circulating gas is returned to the generating chamber 1 by a circulating pump 16. As an electrode 2, a tungsten electrode containing, if necessary, thoria($ThO_2$), zirconia($ZrO_2$) or the like as a stabilizer is positioned by inclining at an angle of 10° to 50° opposite to a suction opening 4. Electric arc 19 is generated by using an electric source 6 having a sufficiently high load voltage, for example, 80 V in dropping characteristics and a gas such as helium, hydrogen, water vapor, nitrogen, or oxygen or a mixture of such a gas with argon. By this arc energy, a base material 5 is molten and vaporized to produce ultrafine particles. At this time, the ultrafine particles are transferred toward the suction opening 4 by the magnetic blow effect caused by the unbalance in electromagnetic force due to the inclination of the electrode 2 in the above-mentioned range of angles. As a result, new metal surfaces appear repeatedly to produce ultrafine particles with high efficiency.

Differences in produced amounts of ultrafine particles by using various base materials are measured by using and inclined electrode and a non-inclined electrode and listed in Table 1.

TABLE 1

| | Element | | | | | | | | | | |
|---|---|---|---|---|---|---|---|---|---|---|---|
| | Ti | V | Cr | Fe | Co | Ni | Cu | Nb | Mo | Ta | W |
| $\delta = \dfrac{M(\theta = 45°)}{M(\theta = 90°)}$ | 1.6 | 21 | 6 | 14 | 2 | 10 | 2 | 2 | 7 | 3 | 4 |

TABLE 1-continued

| | Element | | | | | | | | | |
|---|---|---|---|---|---|---|---|---|---|---|
| | Ti | V | Cr | Fe | Co | Ni | Cu | Nb | Mo | Ta | W |
| | 26 | 7 | 15 | 3 | | | | | 9 | 4 | 5 |

(Note)
θ: Inclined angle of electrode regarding the base material
M(θ): Produced amount of ultrafine particles by an inclined electrode at θ
Arc current: 200 A
Atmospheric gas: Ar + 50% vol. $H_2$ As is clear from Table 1, the produced amounts of ultrafine particles increase without fail and 26 times at most, when the inclined electrode is used. When the arc current increases, the produced amounts increase relatively as shown in Table 2.

TABLE 2

| | | Atmospheric gas | | |
|---|---|---|---|---|
| Current | | Ar + 30% vol.$H_2$ | Ar + 50% vol.$H_2$ | Ar + 70% vol.$H_2$ | $H_2$ |
| 200 A | Arc voltage (V) | 34 | 35 | 45 | 65 |
| | Produced amount (g/hr) | 10 | 49 | 57 | 56 |
| 300 A | Arc voltage (V) | 41 | 40 | 44 | — |
| | Produced amount (g/hr) | 22 | 84 | 100 | — |

In FIG. 1, numeral 3 denotes a pinch gas feeder, 7 is an arc length controlling means, 8 is a motor for moving the base material 5 up and down, 9 and 10 are coolers for cooling gases, 12 is a valve, 13 is a pressure-flow rate regulator for controlling the gas pressure and flow rate, 14 is a gas bomb, 15 is a vacuum pump, 16 is a circulating pump for circulating the gases, 17 is an inlet of cooling water, and 18 is an outlet of cooling water.

Figure 2A:
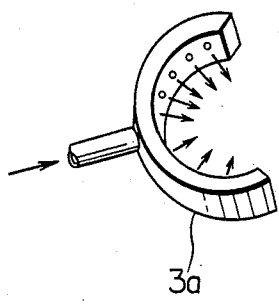
FIG. 2(a) and (b) are perspective views of a pinch gas feeder.
Figure 2B:
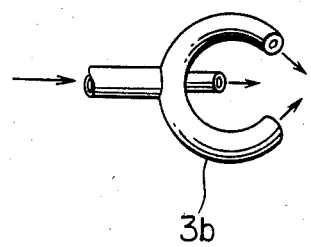

In order to pinch the arc 19 so as to enhance heat centering on the base material surface and to increase the produced amount, it is preferable to use hydrogen ($H_2$) gas having a large pinch effect as shown in Table 2 or water vapor, He, $N_2$, or $O_2$ gas, or a mixture of such a gas with oxygen as the atmosphere. It is effective to blow such a gas as mentioned above cooled by liquid nitrogen or water (see FIG. 1) around or near the arc by using a pinch gas feeder 3 as shown in FIGS. 2(a) and (b).

Figure 3:
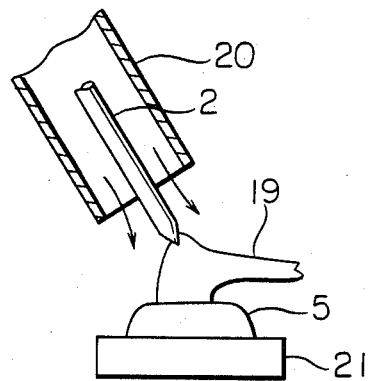
FIG. 3 is a cross-sectional view explaining the feeding of a pinch gas from a portion around an electrode.
Figure 4:
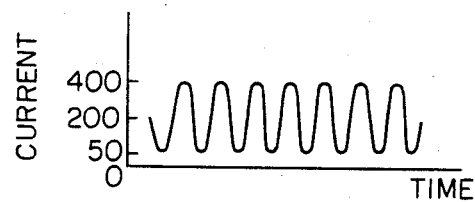
FIG. 4 shows an electric current wave form at the pinching of arc using a high-frequency electric current.

The electric current wave form of arc 19 is shown in FIG. 4. As is clear from FIG. 4, by using a high-frequency electric pulse current of 50 Hz to 20 kHz, the arc 19 is pinched, the heat centering on the base material surface is enhanced, and vapored ultrafine particles are produced with high efficiency. The same effect can be obtained by passing separately a hydrogen gas, He gas, or the like having a larger pinch effect around the electrode 2 via a pinch gas nozzle 20 as shown in FIG. 3. In FIG. 3, numeral 21 is a plate for mounting the base material 5. It is possible to attain the higher efficiency by the co-use of the high-frequency electric current and the pinch gas.

Figure 5:
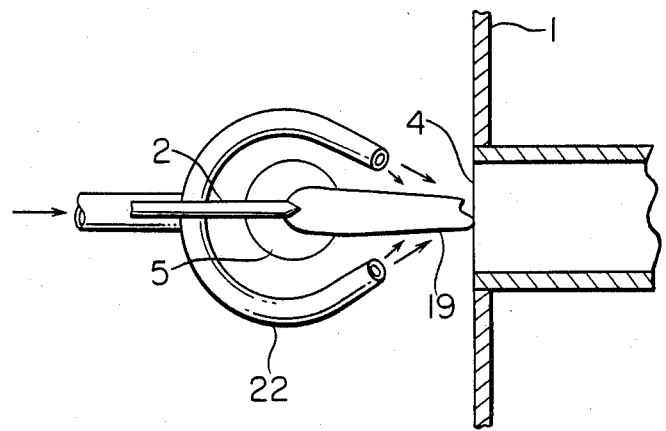
FIG. 5 is a schematic view explaining the uniforming of particle size of ultrafine particles by rapidly cooling a base material vapor.

In order to improve the quality of ultrafine particles, it is necessary to narrow the distribution range of particle size. This can be attained by blowing a cooling gas (similar to the pinch gas) sufficiently cooled with liquid nitrogen, water, or the like from a cooling-gas feeder 22 for the suction opening 4 as shown in FIG. 5.

Figure 6:
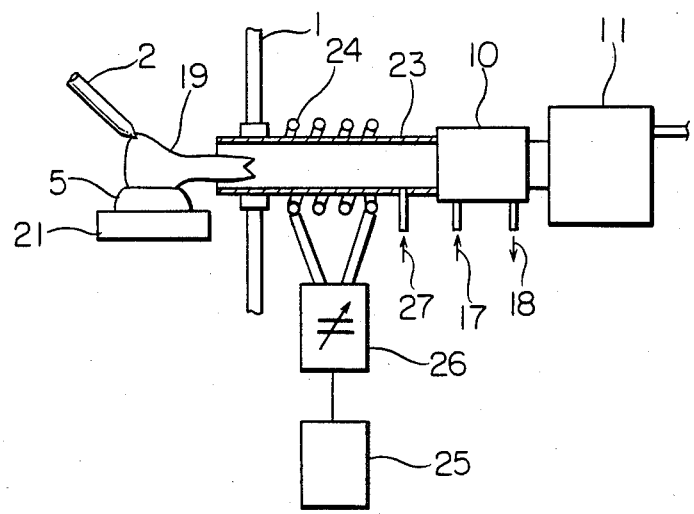
FIG. 6 is a schematic view of a part of another example of the apparatus of this invention.

Further, very fine particles with uniform particle size can be obtained by heating again ultrafine particles in the course of transferring from the generating chamber 1 with another heat source such as high-frequency induction plasma, a infrared heater, resistance heat, or the like and cooled again. FIG. 6 shows such an example, wherein a silica glass tube 23 is placed between the suction opening 4 in the generating chamber 1 and the cooler 10 which is connected to the trapping chamber 11. The silica glass tube 23 is wrapped around by a high-frequency induction coil 24 which is connected to a transmitter 25 and a matching means 26 for generating induction plasma in the silica glass tube 23. The ultrafine particles in the course of transferring is vaporized again and then cooled in the cooler 10. In FIG. 6, numeral 27 denotes a reaction gas feeder, from which reaction particles are produced.

More stable plasma can be obtained by positioning the induction coil 24 nearer the arc flame 19 in the generating chamber 1, that is, the base material vapor.

Figure 7:
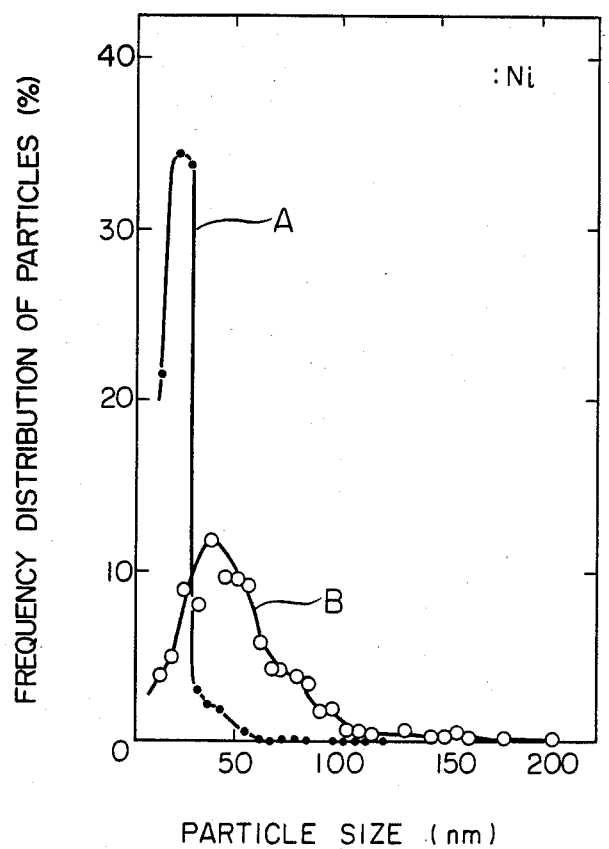
FIG. 7 is a graph showing particle size distributions of very fine particles obtained by a prior art apparatus and the apparatus of this invention.

Particle size distributions of ultrafine particles obtained by generating an arc between a tungsten electrode and a nickel base material in an atmosphere of argon and hydrogen, revaporizing vaporized nickel ultrafine particles by high-frequency induction plasma, followed by rapid cooling are shown in FIG. 7. In FIG. 7, the curve A shows a particle size distribution obtained by using the apparatus of this invention (as shown in FIG. 6), and curve B shows that obtained by using a prior art apparatus as shown in FIG. 1. As is clear from FIG. 7, the particle size distribution is very narrow when the apparatus of this invention is used.

Figure 8A:
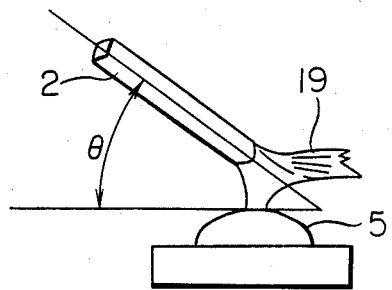
FIG. 8(a) is a schematic view of an electrode and FIG. 8(b) is a graph explaining an influence of the inclined angle of electrode on a produced amount of ultrafine particles.
Figure 8B:
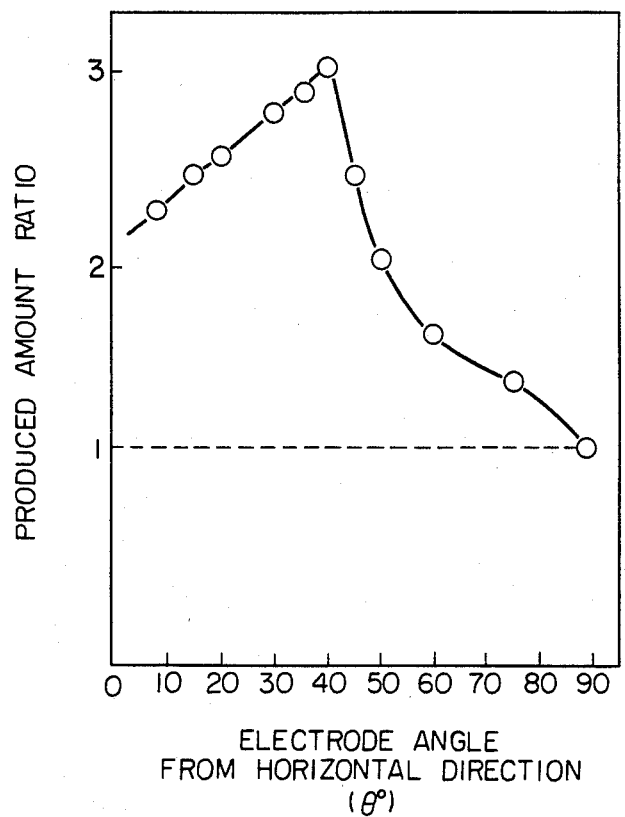

FIG. 8(b) shows a change of produced amount ratios when the angle θ between the base material 5 and the electrode 2 as shown in FIG. 8(a) (hereinafter referred to as "electrode angle") is changed from 10° to 90° using the apparatus shown in FIG. 1 under the following conditions:

base material: Ni
electrode: W containing 2% by weight of thoria, outer diameter 4 mm
atmosphere: argon+50% by volume of $H_2$ with a pressure of about 0.1 MPa
arc current: 150 A
arc voltage: 35 V Taking the produced amount of ultrafine particles 1 when the electrode angle is 90°, that is, the electrode is positioned vertically, the produced amount ratio shows a peak value of 3.1 at the electrode angle of 40°. Reasons for this seem that the arc 19 is drawn by thermal pinch by the action of hydrogen contained in the atmospheric gas, so that a sufficient electric power is supplied from the electric source 6 to the base material 5, and since the arc 19 is deflected by dint of magnetic force generated by the current of 150A, the produced ultrafine particles are blown to the direction of the suction opening 4.

As is clear from FIG. 8, a suitable range of the electrode angle θ between the base material 5 and the electrode 2 is 10° to 50°. These values change mainly by the value of arc current. The range of 10° to 50° is preferable when the arc current changes from 70 A to 500 A. When the electrode angle is less than 10°, the arc start becomes very difficult, the maintenance of arc against a minute change on the molten surface at the time of generating arc becomes difficult and unstable, and cutting of arc easily takes place. On the other hand, when the electrode angle is more than 50°, the production efficiency of ultrafine particles is lowered remarkably.

It is usual to use a material having a high melting point such as W, Ta, or the like as the material for electrode 2 for producing ultrafine particles of metals, alloys and ceramics. When the same material is used as the base material 5 and the electrode 2, i.e., both electrodes, ultrafine particles with higher purity can be obtained.

In order to obtain ultrafine particles of a mixture of two or more kinds of metals or of alloyed metals, alloy starting materials can be used as the base material or the electrode, or materials used for both electrodes can be changed. In order to produce ultrafine particles of carbides such as SiC, TiC, etc., nitrides such as TiN, $Si_3N_4$, etc., and oxides such as $Al_2O_3$, $SnO_2$, etc., it is preferable to mix the atmospheric gas with a gas containing a carbon containing group, a nitrogen-containing group, or an oxygen-containing group.

The produced amount of ultrafine particles changes depending on polarity. It is also possible to use a direct current having a reverse polarity as used above, or to use an alternating current.

Figure 9:
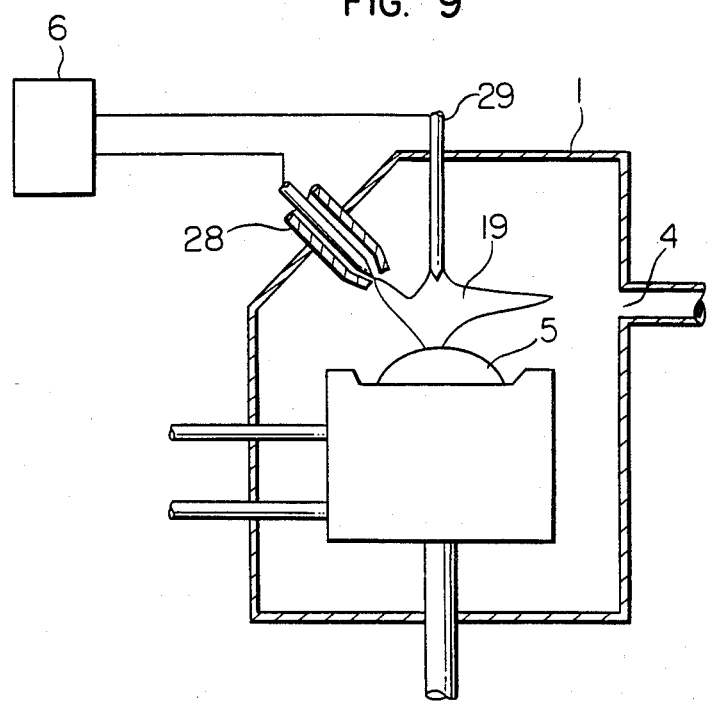
FIG. 9 is a schematic view of a part of further example of the apparatus of this invention.

Another example of a main portion of the apparatus for producing ultrafine particles is shown in FIG. 9, wherein gas plasma arc is generated by a first arc discharge electrode 28 and gas tungsten arc is generated by a second arc discharge electrode 29, both the electrode 28 and the electrode 29 being disposed opposite to the base material and the electrode 29 being vertically positioned within the chamber. The shape of arc 19 is determined by the distance of two electrodes, the angle between the base material 5 and two electrodes, electric current, distances and the current density of arc generated between two electrodes. That is, as shown in FIG. 9, the arc is generated between the electrode 28 for generating a plasma arc and the electrode 29 for generating a gas tungsten arc. For example, the shape of arc shown in FIG. 9 can be obtained by properly selecting electromagnetic force generated between two electrodes. By this arc, ultrafine particles are introduced into the suction opening 4. In this case, the gas plasma arc generated by the first arc discharge electrode 28 is so large in the current density that the arc is hardly deflected by the electromagnetic force. Thus, the base material can be heated and melted efficiently to produce ultrafine particles. On the other hand, the gas tungsten arc generated by the second arc discharge electrode 29 is greatly deflected by mutual interference with the above-mentioned plasma arc, so that the generated ultrafine particles can be transferred to a constant direction rapidly.

Figure 10:
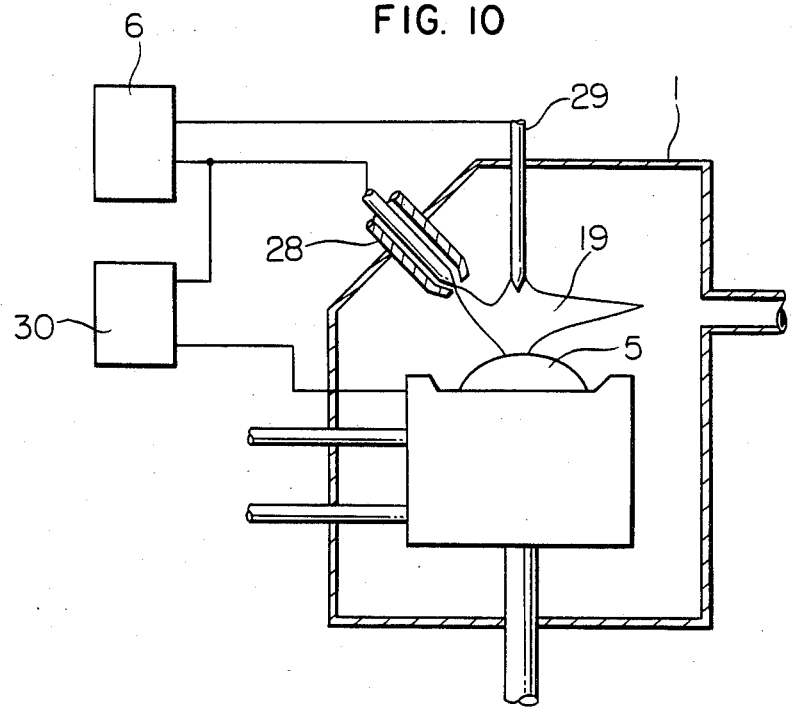
FIG. 10 is a schematic view of a part of still another example of the apparatus of this invention.

FIG. 10 shows a still further example of a main portion of the apparatus for producing ultrafine particles, wherein numeral 30 denotes an electric source for arc discharge and the others are the same as FIG. 9. That is, the electrodes 28 and 29 are disposed opposite to the base material. According to this embodiment, since the first arc discharge electrode 28 and the base material 5 are directly connected to pass an electric current, ultrafine particles can be produced with higher efficiency when an electroconductive material such as Fe, Ni, is used as the base material and W or W +$ThO_2$ is used as the electrode. With the construction, as illustrated in FIG. 10, the arc is generated between the electrode 28 for generating a plasma arc and the electrode 29 for generating a gas tungsten arc, and between the electrode 28 for generating a plasma arc and the base material.

Further, the producing efficiency of ultrafine particles can be improved by using a special material as the base material. Such a material can be obtained by producing in the atmospheric gas of inert gas such as Ar containing a small amount of active gas such as oxygen gas at the time of melting a bulk of raw metal or alloyed metal, or by adding an element for changing surface tension properties of a molten metal to a raw material. More in detail, by adding oxygen to the atmospheric gas at the time of melting the bulk, a part of oxygen makes a solid solution in the bulk and an oxide layer is formed on the surface of bulk. By dissolving this material by arc energy, a large amount of ultrafine particles can be produced. On the other hand, by adding O (oxygen), S (sulfur), Te (tellurium) or Se (selenium) to the raw material (=bulk), the surface tension properties of molten bulk are changed to produce a large amount of ultrafine particles.

This can be explained concretely as follows.

Figure 11:
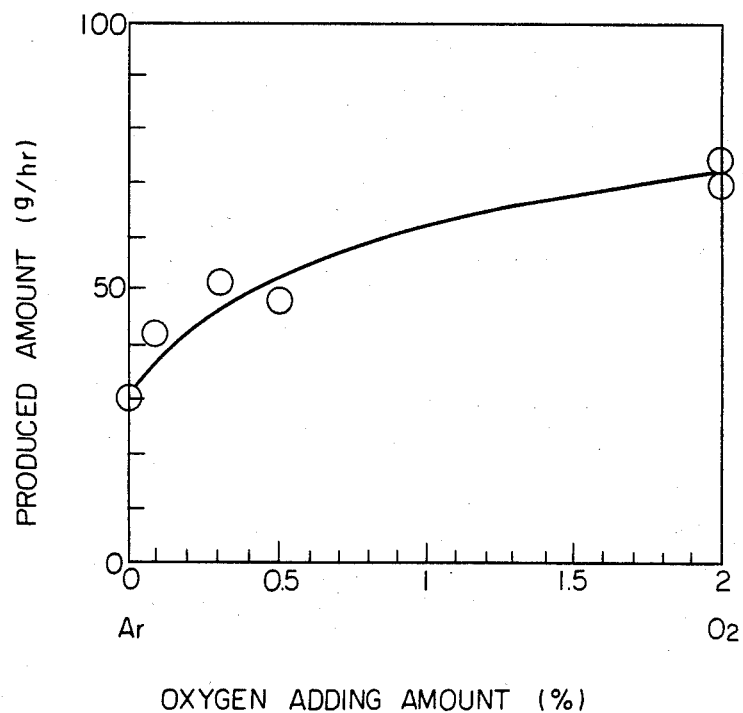
FIG. 11 is a graph showing a relationship between an oxygen adding amount and a produced amount of ultrafine particles.

A bulk of metal is prepared by dissolving pure Ni by a direct current arc in an atmosphere of argon containing 0.1 to 2% by volume of oxygen, followed by solidification. Using this material as the base material, ultrafine particles of Ni are produced in an atmosphere of argon containing 50% by volume of hydrogen, using a tungsten electrode having a diameter of 4 mm as a cathode, making the base material an anode, and by generating a direct current arc of arc current of 150 A. The effect of addition of oxygen to the bulk on the produced amount of ultrafine particles is examined and shown in FIG. 11. As is clear from FIG. 11, when the bulk obtained in the atmosphere added with 2% by volume of oxygen is used, the produced amount increases 2.5 times as large as the case added with no oxygen. This suggests that the oxygen making the solid solution in the bulk and oxide give an influence on the arc energy efficiency and a convective phenomenon of molten metal so as to contribute to the increase of produced amount of ultrafine particles.

It is possible to use an active gas such as carbon dioxide containing oxygen atoms therein in place of oxygen gas at the time of preparing the bulk of metal or ceramic. Further, the same effect can be obtained by using materials obtained by adding S, Se, Te, or the like thereto. In addition, it is also effective when a base material added with O, S, Se or Te is melted and vaporized by using as a heating source laser, high-frequency induction heating source, resistance heat source, etc., except for the arc energy, to produce ultrafine particles.

As the material for bulk, there can be used various pure metals such as Ni, Fe, Ti, Nb, Co, and alloys such as Fe-Co, Fe-Ni-Co, Ni-Co, Ti-N, Ti-C. The bulk can be used in the form of beads, rods, and wires.

What is claimed is:

1. An apparatus for producing ultrafine particles of metals, alloys or ceramics by using arc energy comprising a generating chamber for generating ultrafine particles of metals, alloys or ceramics, an electrode positioned opposite to a base material for producing ultrafine particles so as to generate an electric arc, a suction opening for sucking the ultrafine particles generated in the generating chamber, a trap for collecting the ultrafine particles sucked from the suction opening, and a cooler positioned between the suction opening and the trap for cooling the sucked ultrafine particles, characterized in that the electrode is disposed inclinedly as to the base material so as to produce magnetic blow to the arc,
   the suction opening is positioned at the direction of the arc blown, and
   a cooling-gas feeder is positioned near the arc.

2. An apparatus according to claim 1, wherein the cooling-gas feeder is positioned around the arc.

3. An apparatus according to claim 1, wherein the cooling-gas feeder is positioned between the arc and the suction opening.

4. An apparatus according to claim 2, wherein the electrode is inclined at an angle of 10° to 50° regarding a horizontal line of base material.

5. An apparatus according to claim 2, wherein a pulse current of 50 Hz to 20 kHz is used as an arc current.

6. An apparatus according to claim 2, wherein a heat source for revaporizing the ultrafine particles is placed between the suction opening and the cooler.

7. An apparatus according to claim 3, wherein the electrode is inclined at an angle of 10° to 50° regarding a horizontal line of base material.

8. An apparatus according to claim 3, wherein a pulse current of 50 Hz to 20 kHz is used as an arc current.

9. An apparatus according to claim 3, wherein a heat source for revaporizing the ultrafine particles is placed between the suction opening and the cooler.

10. An apparatus for producing ultrafine particles of metals, alloys or cermics by using arc energy comprising a generating chamber for generating ultrafine particles of metals, alloys or ceramics, at least one electrode positioned opposite to a base material for producing ultrafine particles so as to generate an electric arc, a suction opening for sucking the ultrafine particles generated in the generating chamber, a trap for collecting the ultrafine particles sucked from the suction opening, and a cooler positioned between the suction opening and the trap for cooling the sucked ultrafine particles, characterized in that:
the at least one electrode includes an electrode for generating a plasma arc and disposed inclinedly as to the base material so as to produce magnetic blow to the arc, and another arc discharge electrode disposed opposite to the base material so as to generate a gas tungsten arc in addition to the electrode for generating a plasma arc; and
the suction opening is positioned at the direction of the arc blown.

11. An apparatus according to claim 10, wherein the arc is generated between the electrode for generating a plasma arc and the electrode for generating a gas tungsten arc.

12. An apparatus according to claim 10, wherein the arc is generated between the electrode for generating a plasma arc and the electrode for generating a gas tungsten arc, and between the electrode for generating a plasma arc and the base material.

13. An apparatus for producing ultrafine particles of metals, alloys or ceramics by using arc energy comprising a generating chamber for generating ultrafine particles of metals, alloys or ceramics, an electrode positioned opposite to a base material for producing ultrafine particles so as to generate an electric arc, a suction opening for sucking the ultrafine particles generated in the generating chamber, a trap for collecting the ultrafine particles sucked from the suction opening, and a cooler positioned between the suction opening and the trap for cooling the sucked ultrafine particles, characterized in that
the electrode is disposed inclinedly as to the base material so as to produce magnetic blow to the arc,
the suction opening is positioned at the direction of the arc blown so as to suck a generated vapor, and
the base material is obtained by melting a raw material in a gas atmosphere containing oxygen or by adding an element for increasing surface tension of a molten metal according to an increase of metal temperature.

14. An apparatus according to claim 10, wherein the electrode for generating a gas tungsten arc is disposed at a vertical position within the generating chamber.

* * * * *